June 4, 1968 W. BERGMAN ET AL 3,386,750
VEHICLE SUSPENSION SYSTEM HAVING A FLEXIBLE ARM
Filed Dec. 10, 1965 2 Sheets-Sheet 1
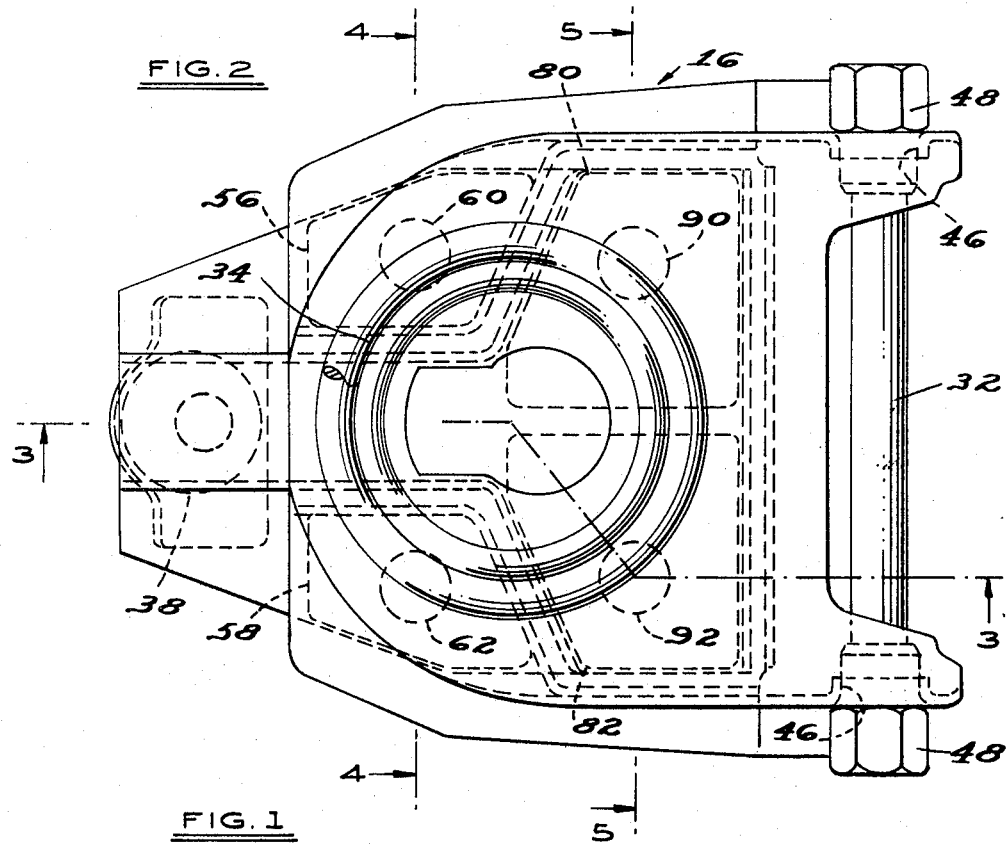
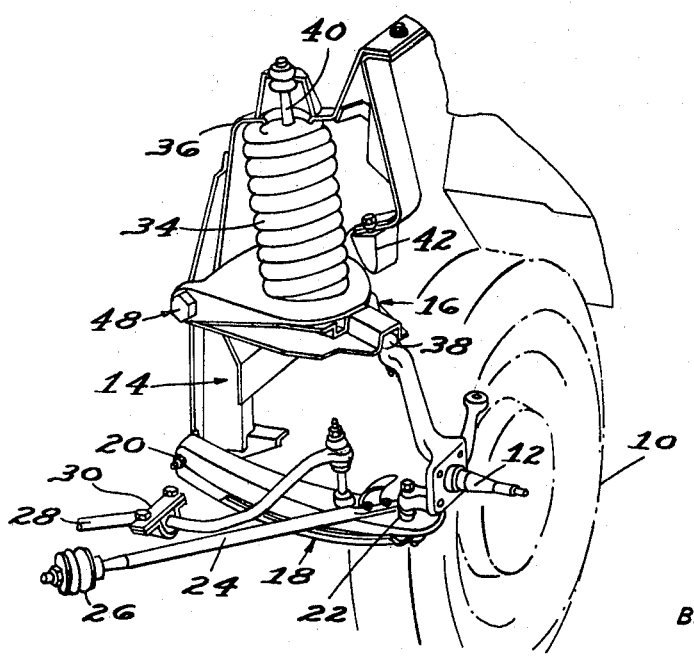
WALTER BERGMAN
ROBERT A. HUSEN
INVENTORS
BY *John R. Faulkner*
*Clifford L. Sadler*
ATTORNEYS

WALTER BERGMAN
ROBERT A. HUSEN
INVENTORS

BY John R. Faulkner
Clifford L. Sadler

ATTORNEYS

# 3,386,750
VEHICLE SUSPENSION SYSTEM HAVING A FLEXIBLE ARM

Walter Bergman and Robert A. Husen, Livonia, Mich., assignors to Ford Motor Company, Dearborn, Mich., a Corporation of Delaware
Filed Dec. 10, 1965, Ser. No. 512,964
15 Claims. (Cl. 280—96.2)

ABSTRACT OF THE DISCLOSURE

A vehicle suspension system having, in its presently preferred embodiment, a two-piece suspension arm with a plurality of rubber elements interposed between the pieces to cushion and isolate road shocks.

---

The present invention relates generally to vehicle suspension systems, and more particularly to a flexible suspension arm for such a system.

The conventional vehicle suspension system provides coil, leaf or some other type of metal spring to resiliently support the vehicle body on the unsprung suspension components. Telescopic hydraulic shock absorbers are also provided to dampen relative movement between the body and the suspension. This arrangement does a fairly good job in providing comfort to the passengers by smoothing out most of the irregularities in the road. When the vehicle is driven over reasonably smooth roads, however, the friction in the suspension system makes the main suspension springs ineffective against vibrations caused by minor road irregularities. Minor objects in the road, such as tar expansion strips in concrete pavement are transmitted to the passenger compartment as noise and vibration.

In view of this problem, it is the principal object of this invention to reduce road induced noise and vibrations inside the passenger compartment by providing an improved vehicle suspension. The reduction in noise and vibration is achieved by introducing resilient elements into the construction of the upper suspension arms.

When driving on relatively smooth roads, the main suspension springs are practically locked by friction and the effective wheel rate is determined by tire characteristics. Under such conditions the dynamic forces between the tire and the road, as well as the vibrations generated by those forces, are controlled by the tire rate. Therefore, to reduce the effective wheel rate, it is an object to provide rubber spring means in a suspension arm.

To achieve an appreciable reduction of noise and vibration, it is necessary to employ rubber springs having rates as low as possible. In order to obtain the desired low rates at the relatively high wheel loads prevailing on a vehicle, relatively large size rubber springs are necessary. It is, therefore, also an object of the present invention to provide an embodiment in which the upper suspension arm is divided into two parts and a plurality of rubber elements is interposed and secured between those parts. These rubber elements act both as springs and isolators.

The many objects and advantages of the present invention will become amply apparent upon consideration of the following description and the accompanying drawings, in which:

FIGURE 1 is a perspective view of an independent front suspension system for a motor vehicle incorporating the present invention;

FIGURE 2 is a top plan view of the upper suspension arm of the suspension in FIGURE 1;

Figure 3:
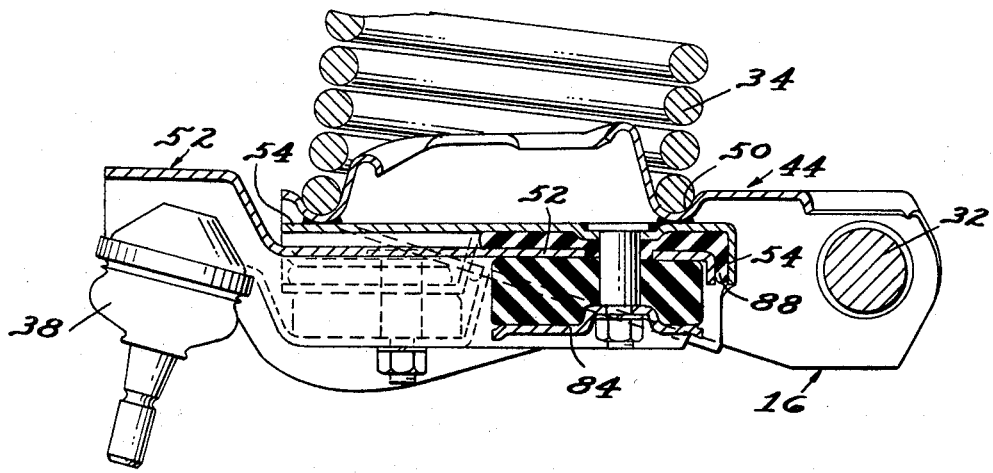
FIGURE 3 is a sectional view taken along section lines 3—3 of FIGURE 2.

Referring now to the drawings for a more complete understanding of this invention, FIGURE 1 illustrates an independent front suspension system for a motor vehicle which incorporates the presently preferred embodiment of this invention. In FIGURE 1 a road wheel 10 is rotatably supported on a spindle 12. The vehicle includes chassis structure 14 that is connected to the spindle 12 by means of upper and lower suspension arm assemblies 16 and 18.

The lower arm 18 is pivotally connected to the chassis 14 by a bolt 20. A ball joint assembly 22 connects the outer end of the arm 18 with the lower end of the spindle 12. A drag strut 24 has its rearmost end riveted to the suspension arm 18 and extends forwardly at an angle to a point where it is connected to the vehicle chassis 14 by a threaded connection and a pair of rubber elements 26. A stabilizer bar 28 for controlling body roll has one end connected to the suspension arm 18 and its other end connected to a suspension arm on the opposite side of the vehicle. The stabilizer bar 28 is supported on the chassis by a pair of rubber mounts, such as mount 30 illustrated in FIGURE 1.

The upper suspension arm 16 has an inner end that is pivotally connected to a pivot shaft 32 supported on the vehicle chassis 14. The outer end of the upper suspension arm 16 is connected to the upper end of a wheel spindle by a ball joint assembly 38. A coil spring 34 has its lower end seated on the suspension arm 16 and its upper end seated in a tower structure 36 which forms a part of the chassis 14. The spring 34 is one of four main suspension springs that support the vehicle chassis and body on the road wheels.

The pivotal connection provided at the inner ends of the upper and lower arms 16, 18 and by the ball joints 22, 38 permits the wheel 10 and spindle 12 to move vertically in jounce and rebound to compensate for road irregularities. This movement of the suspension system is dampened by a telescopic shock absorber 40 that is situated within the coil spring 34. A rubber bumper 42 is secured to a portion of the tower structure 36 and provides a resilient limit to extreme jounce movement of the suspension system and particularly of the upper arm 16.

In order to absorb forces caused by minor road irregularities and to isolate the vibrations that are induced thereby, the upper arm 16 is of two-part construction and has a plurality of rubber elements interposed between the parts. The rubber acts as an isolator of the vibrations and also as a low rate spring.

The upper arm 16 comprises a sheet metal inner arm member 44. Inner arm member 44 is formed with a pair of aligned apertures 46 which receive a pair of threaded bushings 48 that pivotally engage the end of the pivot shaft 32 supported on the chassis 14. The surface of the inner arm portion 44 is contoured with a groove 50 that forms a seat for the coil spring 34.

The other major element of the upper suspension arm 16 is the outer arm member 52. The outer end of the outer arm member 52 is contoured to receive the ball joint assembly 38. A plate 54 is welded to the inner arm portion 44 under the region of the spring groove 50. The outer arm member 52 extends inwardly in an overlapping relationship relative to the plate 54.

Figure 4:
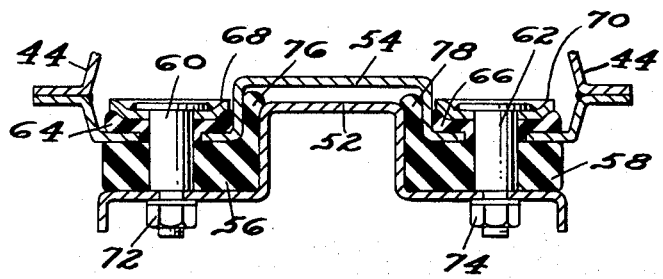
FIGURE 4 is a sectional view taken along section lines 4—4 of FIGURE 4.

Referring to FIGURE 4, which is a sectional view of the overlap between the forward portion of plate 54 and the midportion of the outer arm member 52, it will be noted that the member 52 and plate 54 are channel shape in their central region. They are vertically spaced apart by intermediate rubber elements 56 and 58 situated laterally of the channel portion. The configuration of the rubber elements 56 and 58 is illustrated in plan view by dotted lines in FIGURE 2. Retaining bolts 60 and 62 secure the outer arm member 52 and the plate 54 together against the rubber elements 56 and 58. Rubber donuts 64 and 66 form isolating elements between washers 68 and 70 carried by the heads of the bolts 60, 62 and the plate 54.

It is to be noted that the holes in the plate 54 through which the bolts 60 and 62 pass are enlarged so that flange portions of the rubber donuts 64 and 66 may extend along the shank of the bolts 60, 62 to isolate them from the plate 54. The lower end of the bolts 60, 62 are provided with shoulders so that when the nuts 72 and 74 are tightened the rubber elements 56, 58 and donuts 64, 66 will be loaded in compression to a preset amount.

The centrally situated channel portion of the plate 54 and the outer arm member 52 have laterally spaced apart vertical sides. The rubber elements 56 and 58 are provided with upstanding rubber portions 76 and 78 which extend into the area between the vertical sides of the channels. The rubber portions 76 and 78 are loaded in compression and limit the lateral displacement between the outer arm member 52 and the plate 54 welded to the inner arm member 44.

Figure 5:
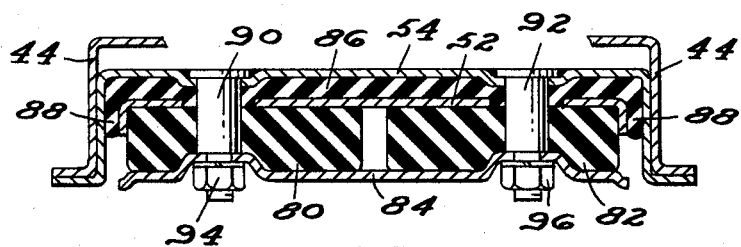
FIGURE 5 is a sectional view taken along section lines 5—5 of FIGURE 2.

Referring now to FIGURE 5 for the construction at the overlap between the inner end of the outer arm member 52 and the plate 54, a pair of rubber elements 80 and 82 are retained against the lower face of the outer arm member 52 by means of a sheet metal retainer 84. A rubber layer 86 is situated between member 52 and plate 54. The rubber 86 extends the width of the plate 54 and has downturned edges 88 that are loaded in compression between the side flanges of the plate 54 and side flanges formed on the lateral edges of the outer arm member 52. The retaining plate 84, the rubber elements 80, 82, the outer arm member 52, the rubber layer 56 and the plate 54 are held in sandwich-like construction by a pair of bolts 90 and 92. The bolts have shoulders formed at their lower ends so that when the nuts 94 and 96 are tightened, the rubber pieces 80, 82 and 86 will be loaded in compression to a preset amount. The downturned edges 88 on the rubber piece 86 form a means for limiting the lateral and lengthwise deflection between the outer arm member 52 and the inner arm member 44.

In summary, the upper arm 16 consists of inner and outer portions 44 and 52 that are separated by inner and outer pairs of rubber elements 56, 58 and 80, 82. These rubber elements act both as springs and as isolators. The outer pair of rubber elements 56, 58 are mounted above the outer arm member 52, however, the inner pair of rubber elements 80 and 82 are mounted below. This type of installation is necessary because the rubber elements transmit not only forces but also a moment caused by their asymmetrical location with respect to the point of load application, the center of the ball joint 38.

A suspension system employing an upper arm constructed in accordance with this invention will provide a vehicle with superior ride characteristics for roads that have minor irregularities. The plurality of rubber elements that separate the major parts of the arm isolate vibration and noise caused by the wheel riding on the ground from being transmitted to the body and the passenger compartment. In addition to being isolators of vibration, the rubber elements are low rate springs which absorb slight jounce movement of the wheel.

The foregoing description presents the presently preferred embodiment of this invention. Modifications and alterations may occur to those skilled in the art, that will come within the scope and spirit of the following claims.

We claim:

1. A vehicle suspension system comprising:
   a chassis having support structure,
   a road wheel,
   a wheel support member rotatably supporting said wheel,
   a first suspension means interposed between said support structure and said wheel support member,
   a second suspension means interposed between said support structure and said wheel support member,
   said first and second suspension means being constructed to position said wheel with respect to said chassis and to define a vertical jounce and rebound path for said wheel,
   said first suspension means comprising a first part connected to said support structure and a second part connected to said wheel support member,
   resilient means interposed between said first and said second parts,
   securing means securing said first part, said second part and said resilient means together as a unitary assembly.

2. A vehicle suspension system according to claim 1 and including:
   a suspension spring interposed between one of said suspension means and said support structure.

3. A vehicle suspension system according to claim 1 and including:
   said first suspension means comprising a suspension arm assembly having one end pivotally connected to said support structure and another end pivotally connected to said support member.

4. A vehicle suspension system according to claim 1 and including:
   said first suspension means comprising a suspension arm assembly having one end pivotally connected to said support structure and another end pivotally connected to said support member,
   a suspension spring interposed between one of said parts and said support structure.

5. A vehicle suspension system according to claim 1 and including:
   said parts being in spaced-apart relationship,
   said resilent means comprising a rubber element interposed between said parts,
   said securing means being constructed for compressing said rubber element,
   means limiting the compression of said rubber element by said securing means.

6. A vehicle suspension system according to claim 1 and including:
   said first part being pivotally connected to said support structure,
   said second part being pivotally connected to said wheel support member.

7. A vehicle suspension system according to claim 1 and including:
   said first part being pivotally connected to said support structure,
   said second part being pivotally connected to said wheel support member,
   said parts being of spaced-apart relationship, a rubber element interposed between said parts.

8. A vehicle suspension system according to claim 1 and including:
   said first suspension means comprising a suspension arm assembly having one end pivotally connected to said support structure and another end pivotally connected to said support member,
   said parts being in spaced-apart relationship,
   a plurality of rubber elements interposed between said parts.

9. A vehicle suspension system according to claim 1 and including:
   said first suspension means comprising a suspension arm assembly having one end pivotally connected to said support structure and another end pivotally connected to said support member,
   said parts being in spaced-apart relationship, a plurality of rubber elements interposed between said parts,
said securing means constructed for compressing said rubber elements,
means limiting the compression of said rubber elements by said securing means.

10. A vehicle suspension system according to claim 1 and including:
said first suspension means comprising a suspension arm assembly having one end pivotally connected to said support structure and another end pivotally connected to said support member,
said parts being in overlapping spaced-apart relationship,
a plurality of rubber elements interposed between said parts,
said securing means constructed for compressing said rubber elements,
means limiting the compression of said rubber elements by said securing means,
a suspension spring interposed between said suspension arm and said support structure.

11. A vehicle suspension system comprising:
a chassis having support structure,
a road wheel,
a wheel support member rotatably supporting said wheel,
a suspension arm pivotally connected to said support structure and to said wheel support member,
said arm comprising a first part connected to said support structure and a second part connected to said wheel support member,
resilient means interposed between said first and said second parts,
securing means securing said first part, said second part and said resilient means together as a unitary assembly.

12. A vehicle suspension system according to claim 11 and including:
a suspension spring interposed between said suspension means and said support structure.

13. A vehicle suspension system according to claim 11 and including:
said parts being in spaced-apart relationship,
a rubber element interposed between said parts,
said securing means being constructed for compressing said rubber element.

14. A vehicle suspension system according to claim 11 and including:
said parts being in spaced-apart relationship,
a rubber element interposed between said parts,
said securing means constructed for compressing said rubber elements,
means limiting the compression of said rubber element by said securing means.

15. A vehicle suspension system according to claim 11 and including:
said parts being in overlapping spaced-apart relationship,
a plurality of rubber elements interposed between said parts,
said securing means constructed for compressing said rubber elements,
means limiting the compression of said rubber elements by said securing means.

References Cited

UNITED STATES PATENTS

| | | | |
|---|---|---|---|
| 2,501,796 | 3/1950 | Tucker | 280—124.1 |
| 3,075,787 | 1/1963 | Mineck | 280—96.2 |

FOREIGN PATENTS

| | | |
|---|---|---|
| 467,983 | 4/1914 | France. |
| 830,900 | 2/1952 | Germany. |
| 886,984 | 8/1953 | Germany. |

PHILIP GOODMAN, *Primary Examiner.*